United States Patent
Liu et al.

(10) Patent No.: US 11,382,177 B2
(45) Date of Patent: Jul. 5, 2022

(54) HEATING APPARATUS AND TEMPERATURE CONTROL CIRCUIT AND TEMPERATURE CONTROL METHOD THEREOF

(71) Applicant: RICHTEK TECHNOLOGY CORPORATION, Zhubei (TW)

(72) Inventors: Kuo-Chi Liu, Hsinchu (TW); Chang-Yu Ho, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 763 days.

(21) Appl. No.: 16/374,688

(22) Filed: Apr. 3, 2019

(65) Prior Publication Data
US 2020/0045773 A1  Feb. 6, 2020

(30) Foreign Application Priority Data
Aug. 6, 2018  (CN) .......................... 201810884538.1

(51) Int. Cl.
*H05B 1/02*   (2006.01)
*G05D 23/19*  (2006.01)
*G05D 23/24*  (2006.01)

(52) U.S. Cl.
CPC ....... *H05B 1/0225* (2013.01); *G05D 23/1906* (2013.01); *G05D 23/24* (2013.01)

(58) Field of Classification Search
CPC .......... G05D 23/1906; G05D 23/1913; G05D 23/24; H05B 1/0225
See application file for complete search history.

(56) References Cited

U.S. PATENT DOCUMENTS

| | | | | |
|---|---|---|---|---|
| 4,138,607 A | * | 2/1979 | Engelmann | ........ G05D 23/1932 307/41 |
| 6,911,628 B1 | * | 6/2005 | Hirayama | ............ H05B 1/0233 219/486 |
| 2013/0264329 A1 | * | 10/2013 | Wang | ................... H05B 1/0272 219/477 |

* cited by examiner

*Primary Examiner* — Marc E Norman
(74) *Attorney, Agent, or Firm* — Tung & Associates

(57) ABSTRACT

A heating apparatus includes: first and second heaters, first and second switches, first and second ramp signal generation circuits, a signal processor circuit, first and second comparison circuits, and a switch control circuit. The first and second ramp signal generation circuits generate first and second ramp signals according to first and second output currents, respectively. The signal processor circuit senses a temperature to generate a temperature-related signal. The first and second comparison circuits compare the first and second ramp signals with the temperature-related signal, to generate a first PWM signal and a second PWM signal for controlling the first and second switches respectively, to determine the first and second output currents so that there is a predetermined ratio between average powers of the first heater and the second heater.

31 Claims, 6 Drawing Sheets

HEATING APPARATUS AND TEMPERATURE CONTROL CIRCUIT AND TEMPERATURE CONTROL METHOD THEREOF

CROSS REFERENCE

The present invention claims priority to CN 201810884538.1, filed on Aug. 6, 2018.

BACKGROUND OF THE INVENTION

Field of Invention

The present invention relates to a heating apparatus. In particular, the present invention relates to such heating apparatus, which is capable of regulating powers of different heaters respectively by means of one single temperature sensor, so that there is a predetermined ratio between the average powers of the different heaters, whereby the heating apparatus can adjust the temperatures of the heaters each to a respective predetermined temperature level. In addition, the present invention relates to a temperature control circuit and a temperature control method of the above-mentioned heating apparatus.

Description of Related Art

Typically, a prior art heating apparatus includes plural (two or more) heaters. When these heaters are coupled in parallel or in series and the currents required by these heaters are supplied from one single common power supply, because each respective heater has its impedance (that is, different heaters may have different impedances from each other), the prior art heating apparatus cannot adjust the temperatures of different heaters to the same and uniform temperature. Consequently, different areas in a heating suit etc. will have different temperatures, which is a significant drawback of the prior art heating apparatus.

In another prior art heating apparatus, in order to ensure the temperatures of different heaters can be adjusted to one uniform temperature, plural temperature sensors corresponding to the number of heaters are installed. However, this arrangement increases the complexity of control and the manufacturing cost, which is disadvantageous.

For relevant details as to how the prior art heating apparatus operates, one can refer to U.S. Pat. No. 8,927,908.

In view of the above, to overcome the drawbacks in the prior art heating apparatuses, the present invention provides a heating apparatus and a temperature control circuit and a temperature control method thereof. The present invention is capable of regulating powers of different heaters respectively by means of one single temperature sensor, so that there is a predetermined ratio between the average powers of the different heaters, whereby the heating apparatus can adjust the temperatures of the heaters each to a respective predetermined temperature level.

SUMMARY OF THE INVENTION

From one perspective, the present invention provides a heating apparatus, comprising: a first heater and a second heater; a first switch coupled in series to the first heater, wherein the first switch and the first heater are coupled in series between a power supply and a ground voltage level, the first switch being configured to be operably turned ON or turned OFF according to a first switch signal, to control a first output current flowing through the first heater; a second switch coupled in series to the second heater, wherein the second switch and the second heater are coupled in series between the power supply and the ground voltage level, the second switch being configured to be operably turned ON or turned OFF according to a second switch signal, to control a second output current flowing through the second heater; a first ramp signal generation circuit, which is configured to operably generate a first ramp signal according to the first output current; a second ramp signal generation circuit, which is configured to operably generate a second ramp signal according to the second output current; a signal processor circuit, which is configured to operably sense a temperature to generate a temperature-related signal according to the temperature; a first comparison circuit, which is configured to operably compare the first ramp signal with the temperature-related signal, to generate a first pulse width modulation (PWM) signal; a second comparison circuit, which is configured to operably compare the second ramp signal with the temperature-related signal, to generate a second PWM signal; and a switch control circuit, which is coupled to the first comparison circuit and the second comparison circuit; wherein the switch control circuit is configured to operably generate the first switch signal according to the first PWM signal; wherein the switch control circuit is configured to operably generate the second switch signal according to the second PWM signal; whereby, there is a predetermined ratio between a first average power of the first heater and a second average power of the second heater.

From another perspective, the present invention provides a temperature control circuit of a heating apparatus, the heating apparatus including: a first heater and a second heater; the temperature control circuit of the heating apparatus comprising: a first switch coupled in series to the first heater, wherein the first switch and the first heater are coupled in series between a power supply and a ground voltage level, the first switch being configured to be operably turned ON or turned OFF according to a first switch signal, to control a first output current flowing through the first heater; a second switch coupled in series to the second heater, wherein the second switch and the second heater are coupled in series between the power supply and the ground voltage level, the second switch being configured to be operably turned ON or turned OFF according to a second switch signal, to control a second output current flowing through the second heater; a first ramp signal generation circuit, which is configured to operably generate a first ramp signal according to the first output current; a second ramp signal generation circuit, which is configured to operably generate a second ramp signal according to the second output current; a signal processor circuit, which is configured to operably sense a temperature to generate a temperature-related signal according to the temperature; a first comparison circuit, which is configured to operably compare the first ramp signal with the temperature-related signal, to generate a first pulse width modulation (PWM) signal; a second comparison circuit, which is configured to operably compare the second ramp signal with the temperature-related signal, to generate a second PWM signal; and a switch control circuit, which is coupled to the first comparison circuit and the second comparison circuit; wherein the switch control circuit is configured to operably generate the first switch signal according to the first PWM signal; wherein the switch control circuit is configured to operably generate the second switch signal according to the second PWM signal; whereby, there is a predetermined ratio between a first average power of the first heater and a second average power of the second heater.

In one embodiment, the first ramp signal has a first slope which is positively correlated with the first output current, such that an ON period of the first switch is negatively correlated with the first output current, and the second ramp signal has a second slope which is positively correlated with the second output current, such that an ON period of the second switch is negatively correlated with the second output current.

In one embodiment, the predetermined ratio of the first average power of the first heater to the second average power of the second heater is 1:1.

In one embodiment, the first switch and the second switch are turned-ON at the same timing.

In one embodiment, the first switch and the second switch are turned-ON at different timings, thereby lowering a peak value of a supply current provided by the power supply, wherein the supply current includes the first output current and the second output current.

In one embodiment, the ON period of the second switch is separated from ON period of the second switch.

In one embodiment, a turned-OFF timing of the first switch determines a turned-OFF timing of the second switch.

In one embodiment, a clock signal determines a turned-ON timing of the first switch and/or a turned-ON timing of the second switch.

In one embodiment, when the first ramp signal reaches the temperature-related signal, the first PWM signal turns OFF the first switch; and, when the second ramp signal reaches the temperature-related signal, the second PWM signal turns OFF the second switch.

In one embodiment, the signal processor circuit includes: a temperature sensing circuit, which is configured to operably sense the temperature to generate a temperature sensing signal; and an error amplifier circuit coupled to the temperature sensing circuit, the error amplifier circuit being configured to operably generate the temperature-related signal according to a difference between the temperature sensing signal and a reference voltage; whereby, the heating apparatus adjusts the temperature to a predetermined temperature level.

In one embodiment, the temperature sensing circuit includes: a current source, which is configured to operably supply an operation current to a temperature sensor, wherein the temperature sensor generate the temperature sensing signal according to the operation current and the temperature.

In one embodiment, the temperature sensor includes: a negative temperature coefficient thermistor.

In one embodiment, the first ramp signal generation circuit includes: a first current sensing circuit, which is configured to operably sense the first output current, wherein the first current sensing circuit is configured to operably generate a first sensing current according to the sensed first output current; and a first capacitor, which is configured to operably generate the first ramp signal according to the first sensing current flowing through the first capacitor.

In one embodiment, the second ramp signal generation circuit includes: a second current sensing circuit, which is configured to operably sense the second output current, wherein the second current sensing circuit is configured to operably generate a second sensing current according to the sensed second output current; and a second capacitor, which is configured to operably generate the second ramp signal according to the second sensing current flowing through the second capacitor.

From yet another perspective, the present invention provides a temperature control method of a heating apparatus, the heating apparatus including a first heater and a second heater; a first switch coupled in series to the first heater, wherein the first switch and the first heater are coupled in series between a power supply and a ground voltage level, the first switch being configured to control a first output current flowing through the first heater; and a second switch coupled in series to the second heater, wherein the second switch and the second heater are coupled in series between the power supply and the ground voltage level, the second switch being configured to control a second output current flowing through the second heater; the temperature control method comprising: generating a first ramp signal according to the first output current; generating a second ramp signal according to the second output current; generating a temperature-related signal according to a temperature; comparing the first ramp signal with the temperature-related signal, to generate a first PWM signal for controlling the first switch; and comparing the second ramp signal with the temperature-related signal, to generate a second PWM signal for controlling the second switch; whereby, there is a predetermined ratio between a first average power of the first heater and a second average power of the second heater.

In one embodiment, the step of generating a temperature-related signal includes the following steps: sensing the temperature to generate a temperature sensing signal; and generating the temperature-related signal according to a difference between the temperature sensing signal and a reference voltage, whereby, the heating apparatus adjusts the temperature to a predetermined temperature level.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signals, but not drawn according to actual scale of circuit sizes and signal amplitudes and frequencies.

Figure 1:
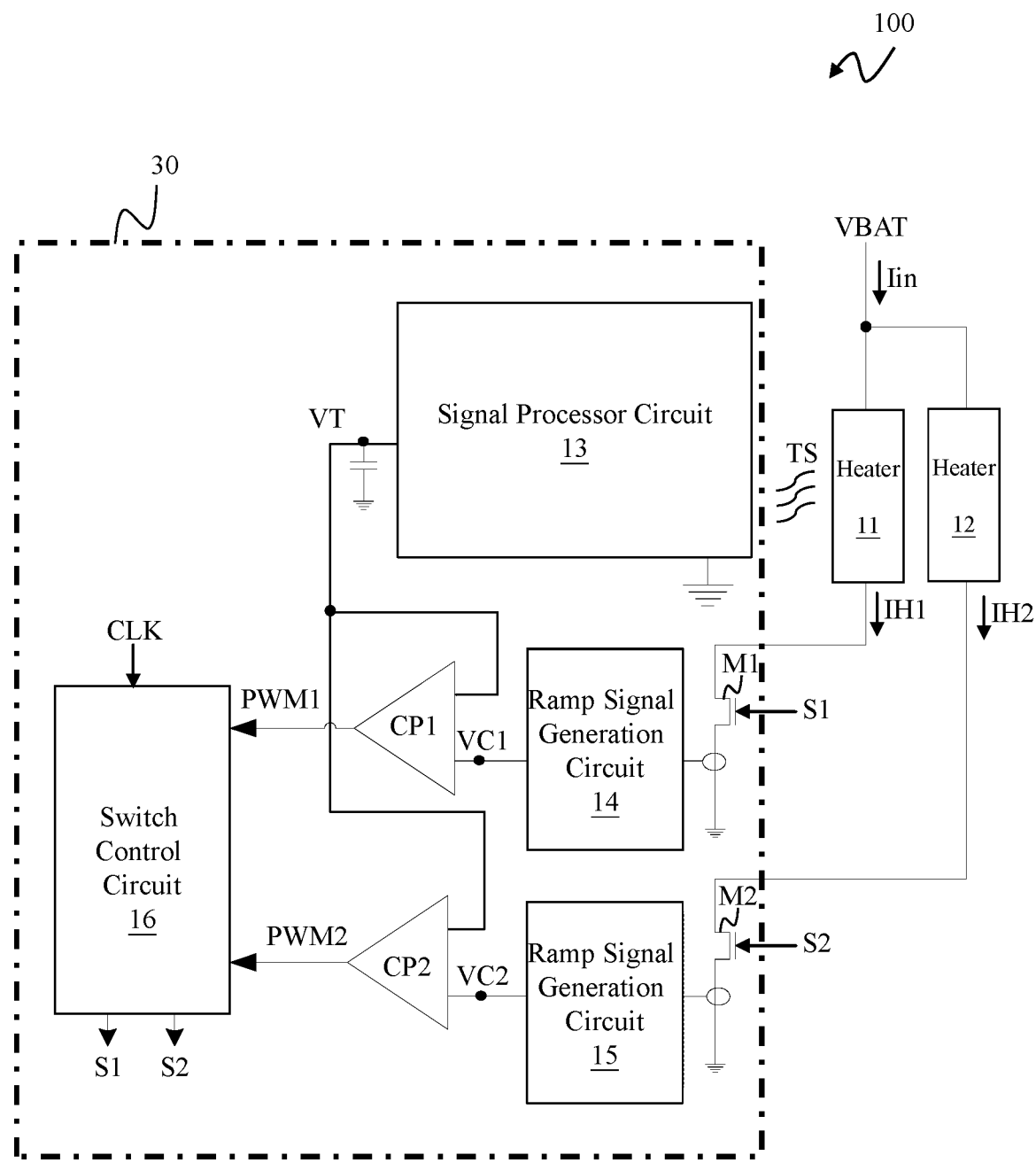
FIG. 1 shows a block diagram of a heating apparatus according to an embodiment of the present invention.
Figure 2:
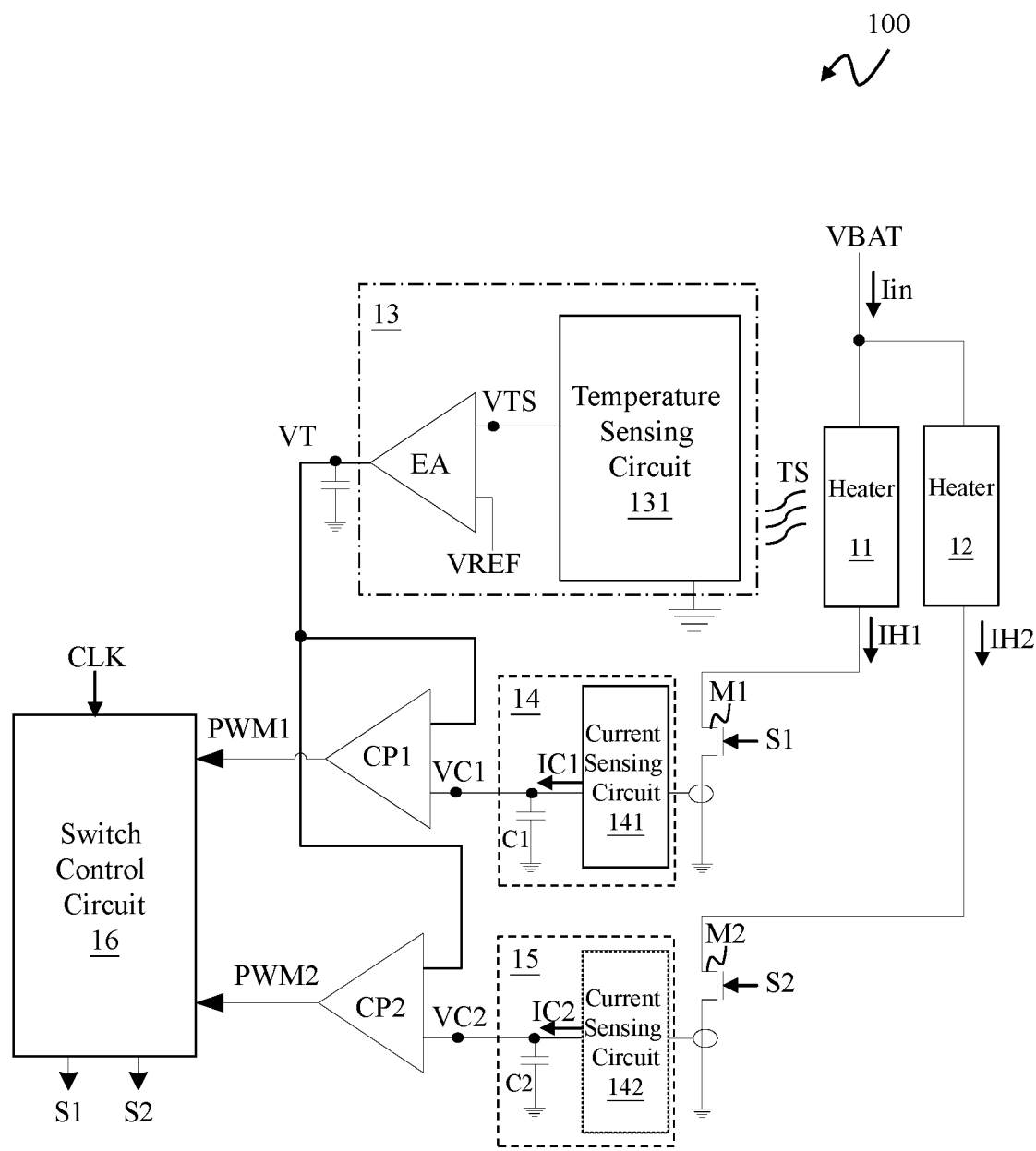
FIG. 2 shows a block diagram of a signal processor circuit 13, a first ramp signal generation circuit 14 and a second ramp signal generation circuit 15 according to an embodiment of the present invention.
Figure 3:
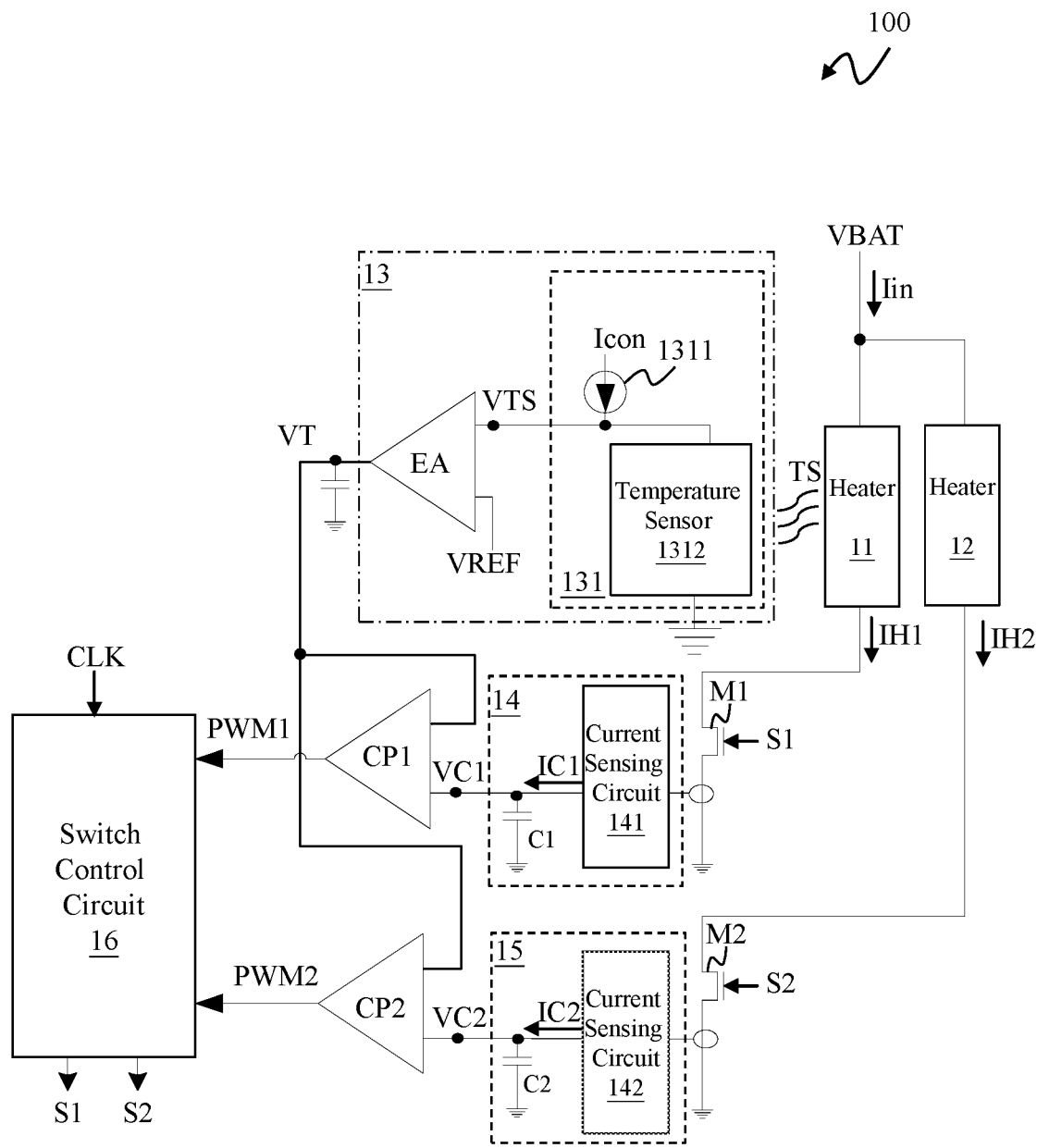
FIG. 3 shows a block diagram of a temperature sensing circuit 131 according to a specific embodiment of the present invention.

Please refer to FIGS. 1 to 3. FIG. 1 shows a block diagram of a heating apparatus according to an embodiment of the present invention. FIG. 2 shows a block diagram of a signal processor circuit 13, a first ramp signal generation circuit 14 and a second ramp signal generation circuit 15 according to an embodiment of the present invention. FIG. 3 shows a block diagram of a temperature sensing circuit 131 according to a specific embodiment of the present invention.

As shown in FIG. 1, the heating apparatus 100 of the present invention comprises: a heater 11, a heater 12, a switch M1, a switch M2, a ramp signal generation circuit 14, a ramp signal generation circuit 15, a signal processor circuit 13, a comparison circuit CP1, a comparison circuit CP2 and a switch control circuit 16.

Note that, in the illustrative embodiment shown in FIGS. 1 to 3, two heaters 11 and 12 are illustrated as an example. Two heaters 11 and 12 correspond to two switches M1 and M2, two ramp signal generation circuits 14 and 15 and two comparison circuits CP1 and CP2, respectively. However certainly, the numbers for the heater, the switch, the ramp signal generation circuit and the comparison circuit are not limited to two. It is also practicable and within the scope of the present invention that the heating apparatus 100 includes, for example but not limited to, N heaters, and N corresponding switches, N corresponding ramp signal generation circuits and N corresponding comparison circuits, respectively, wherein N is any positive integer which is greater than or equal to two. In the following description, the heating apparatus 100 of the present invention includes two heaters 11 and 12, corresponding to two switches M1 and M2, two ramp signal generation circuits 14 and 15 and two comparison circuits CP1 and CP2, as an example.

The switch M1 and the heater 11 are coupled in series between a power supply VBAT and a ground voltage level. The switch M1 is turned ON or turned OFF according to a switch signal S1, to control an output current IH1 flowing through the heater 11. Besides, the switch M2 and the heater 12 are coupled in series between the power supply VBAT and the ground voltage level. The switch M2 is turned ON or turned OFF according to a switch signal S2, to control an output current IH2 flowing through the heater 12.

In one embodiment, the power supply VBAT can be, for example but not limited to, a battery. The power supply VBAT provides a supply current Iin to the heaters 11 and 12. In one embodiment, the supply current Iin includes the output current IH1 flowing through the heater 11 and the output current IH2 flowing through the heater 12.

In one embodiment, the heater 11 has its own impedance, and the heater 12 has its own impedance. The impedances of the heater 11 and the heater 12 are different from each other.

To give an example for illustration, the power supply VBAT for example provides a voltage level of 8V; the heater 11 for example has an impedance of 2 ohm; the heater 12 for example has an impedance of 1 ohm. Accordingly, the output current IH1 flowing through the heater 11 is 4 ampere (A); the output current IH2 flowing through the heater 12 is 8 ampere (A).

Certainly, the above-mentioned values of the voltage level provide by the power supply VBAT, the impedance of the heater 11, the impedance of the heater 12, the current level of the output current IH1 and the current level of the output current IH2 are only given as an illustrative example, but not for limiting the scope of the present invention. In other embodiments, it is also practicable and within the scope of the present invention that the voltage level provide by the power supply VBAT, the impedance of the heater 11, the impedance of the heater 12, the current level of the output current IH1 and the current level of the output current IH2 are other values.

Please refer to FIG. 1. As shown in FIG. 1, in one embodiment, the ramp signal generation circuit 14 is configured to operably generate a ramp signal VC1 according to the output current IH1, and, the ramp signal generation circuit 15 is configured to operably generate a ramp signal VC2 according to the output current IH2. In one embodiment, the slope of the ramp signal VC1 can be, for example but not limited to, positively correlated with the output current IH1 (i.e., positively correlated with the level of the output current IH1), and an ON period T1 of the switch S1 can be, for example but not limited to, negatively correlated with the output current IH1 (i.e., negatively correlated with the level of the output current IH1). And, the slope of the ramp signal VC2 can be, for example but not limited to, positively correlated with the output current IH2 (i.e., positively correlated with the level of the output current IH2), and an ON period T2 of the switch S2 can be, for example but not limited to, negatively correlated with the output current IH2 (i.e., negatively correlated with the level of the output current IH2). The relevant details as to how above are implemented will be described later.

Please refer to FIG. 1 in conjugation with FIGS. 2-3. As shown in FIGS. 2-3, in one specific embodiment, the ramp signal generation circuit 14 includes: a current sensing circuit 141 and a capacitor C1. In particular, the current sensing circuit 141 is configured to operably sense the output current IH1 flowing through the switch M1, to generate a sensing current IC1 according to the sensed output current IH1. The capacitor C1 is configured to operably generate the ramp signal VC1 according to the sensing current IC1 flowing through the capacitor C1. And, the ramp signal generation circuit 15 includes: a current sensing circuit 142 and a capacitor C2. In particular, the current sensing circuit 142 is configured to operably sense the output current IH2 flowing through the switch M2, to generate a sensing current IC2 according to the sensed output current IH2. The capacitor C2 is configured to operably generate the ramp signal VC2 according to the sensing current IC2 flowing through the capacitor C2.

In one embodiment, the sensing current IC1 can be, for example but not limited to, positively correlated with the output current IH1. For example, in one embodiment, the sensing current IC1 can be proportional to the output current IH1. And, the sensing current IC2 can be, for example but not limited to, positively correlated with the output current IH2. For example, in one embodiment, the sensing current IC2 can be proportional to the output current IH2.

Following the previously given example wherein the power supply VBAT provides 8V; the heater 11 has an impedance of 2 ohm; the heater 12 has an impedance of 1 ohm; the output current IH1 flowing through the heater 11 is 4 ampere (A); and the output current IH2 flowing through the heater 12 is 8 ampere (A); when the sensing current IC1 is proportional to the output current IH1 (e.g., when a ratio of IC1/IH1 is $1:10^6$), the sensing current IC1 is 4 micro-ampere (μA), and when the sensing current IC2 is proportional to the output current IH2 (e.g., when a ratio of IC2/IH2 is $1:10^6$), the sensing current IC2 is 8 micro-ampere (μA).

Certainly, it should be understood that the values of the sensing current IC1 and sensing current IC2 are given only as an illustrative example, but not for limiting the scope of the present invention. It is also practicable and within the scope of the present invention that the sensing current IC1 and the sensing current IC2 are other values.

As shown in FIG. 1, in one embodiment, the signal processor circuit 13 is configured to operably sense a temperature TS corresponding to the heater 11 and/or the heater 12. The signal processor circuit 13 generates a temperature-related signal VT according to the temperature TS. In one embodiment, the signal processor circuit 13 can sense the temperature TS from, for example but not limited to, a location or a part of the heater 11, a location or a part of the heater 12, or a location or a part at any other area which influenced by the heater 11 and/or the heater 12.

Please refer to FIG. 2 in conjugation with FIG. 1. As shown in FIG. 2, in one specific embodiment, the signal processor circuit 13 includes: a temperature sensing circuit 131 and an error amplifier circuit EA. The temperature sensing circuit 131 is configured to operably sense the temperature TS, to generate a temperature sensing signal VTS. The error amplifier circuit EA is configured to operably generate the temperature-related signal VT according to a difference between the temperature sensing signal VTS and a reference voltage VREF, whereby the heating apparatus 100 can adjust the temperature TS to a predetermined temperature level. The features and the details as to how the heating apparatus 100 adjusts the temperature TS to a predetermined temperature level will be described later.

Please refer to FIG. 3 in conjugation with FIG. 1. As shown in FIG. 3, in one specific embodiment, the temperature sensing circuit 131 includes a current source 1311. In one embodiment, the current source 1311 is configured to operably supply an operation current Icon to a temperature sensor 1312.

Figure 4:
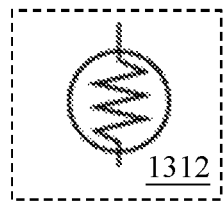
FIG. 4 shows a specific embodiment of a temperature sensor 1312.

In one embodiment, the temperature sensor 1312 can be, for example but not limited to, a negative temperature coefficient (NTC) thermistor (as shown in FIG. 4). The temperature sensor 1312 can generate the temperature sensing signal VTS for example according to the operation current Icon and the temperature TS.

It is noteworthy that, as compared to the prior art, the present invention requires only one single temperature sensor 1312. With one single temperature sensor 1312, the heating apparatus 100 of the present invention is capable of regulating powers of different heaters 11 and 12 respectively, so that there is a predetermined ratio between the average powers of the different heaters 11 and 12, and consequently, the heating apparatus 100 of the present invention can adjust the temperatures of different heaters 11 and 12 to respective predetermined temperature levels. In one embodiment, the predetermined ratio of the average power of the heater 11 to the average power of the heater 12 can be, for example but not limited to, 1:1, and the heating apparatus 100 can adjust different heaters 11 and 12 to one uniform temperature. In other embodiments, the predetermined ratio is not necessarily 1:1 butcan be another value.

Please still refer to FIGS. 1-3. The comparison circuit CP1 is coupled between the signal processor circuit 13 and the ramp signal generation circuit 14. The comparison circuit CP1 is configured to operably compare the ramp signal VC1 with the temperature-related signal VT, to generate a pulse width modulation (PWM) signal PWM1. Besides, the comparison circuit CP2 is coupled between the signal processor circuit 13 and the ramp signal generation circuit 15. The comparison circuit CP2 is configured to operably compare the ramp signal VC2 with the temperature-related signal VT, to generate a PWM signal PWM2.

The switch control circuit 16 is coupled to the comparison circuit CP1 and the comparison circuit CP2. The switch control circuit 16 is configured to operably generate the switch signal S1 according to the PWM signal PWM1, and generate the switch signal S2 according to the PWM signal PWM2.

The switch M1 is turned ON or turned OFF according to the switch signal S1, to control the output current IH1 flowing through the heater 11. The switch M2 is turned ON or turned OFF according to the switch signal S2, to control the output current IH2 flowing through the heater 12.

Accordingly, in the present invention, with one single temperature sensor 1312, the heating apparatus 100 of the present invention is capable of regulating powers of different heaters 11 and 12 respectively, so that there is a predetermined ratio between the average powers of the different heaters 11 and 12, and consequently, the heating apparatus 100 of the present invention can adjust the temperatures of different heaters 11 and 12 to respective predetermined temperature levels. In one embodiment, the predetermined ratio of the average power of the heater 11 to the average power of the heater 12 can be, for example but not limited to, 1:1, and the heating apparatus 100 can adjust different heaters 11 and 12 to one uniform temperature.

Preferably, in one embodiment, in the heating apparatus 100 of the present invention, components or circuits such as the switch M1, the switch M2, the ramp signal generation circuit 14, the ramp signal generation circuit 15, the signal processor circuit 13, the comparison circuit CP1, the comparison circuit CP2 and the switch control circuit 16 are integrated into a temperature control circuit 30 (which is preferably an integrated circuit chip), as shown by the dash-dot frame in FIG. 1.

The following description will explain the features and the details as to how the heating apparatus 100 of the present invention adjusts the temperatures of different heaters 11 and 12 to one uniform temperature by one single temperature sensor 1312.

Figure 5:
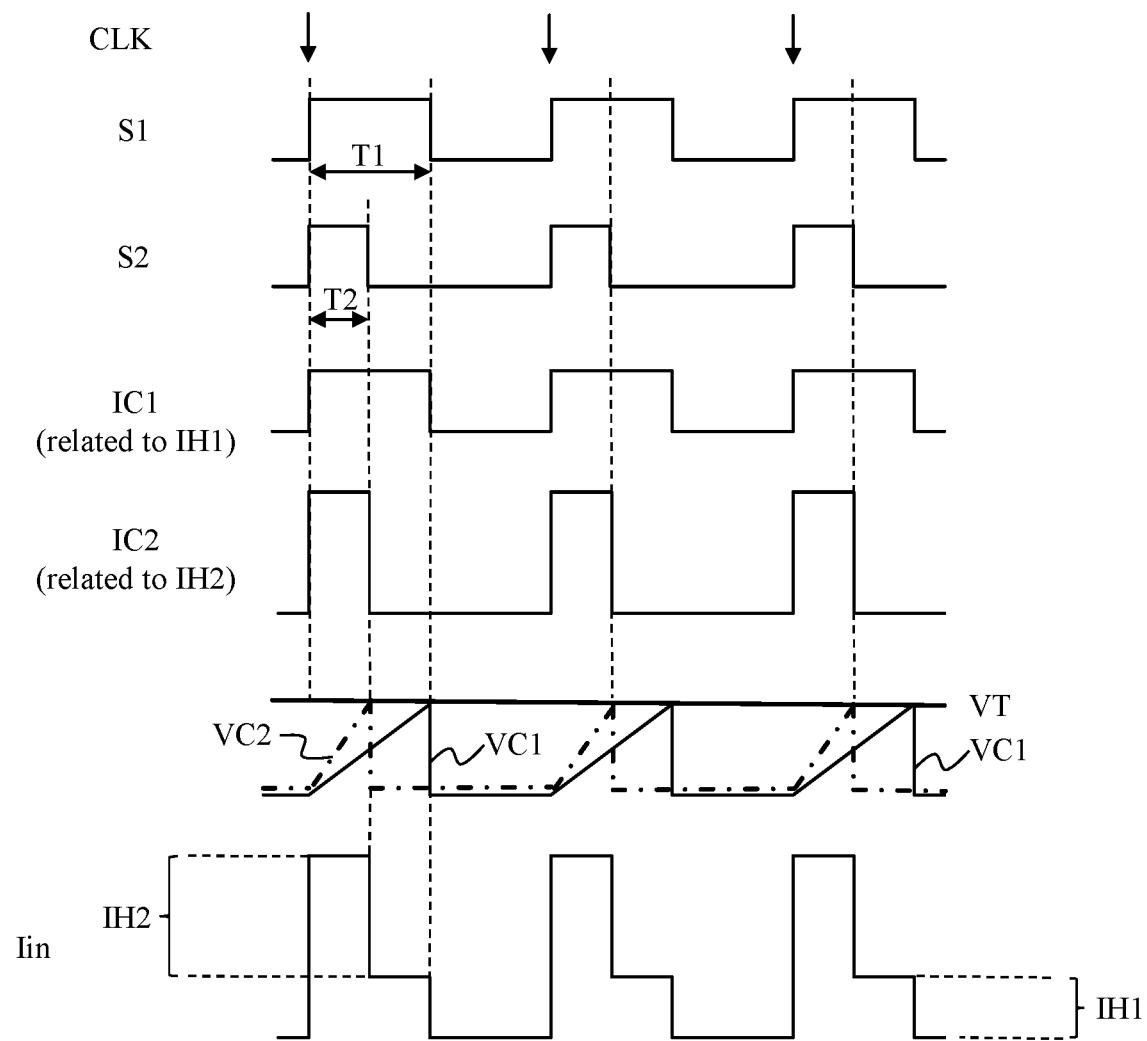
FIG. 5 shows waveforms of different signals of a heating apparatus according to the present invention, wherein the turned-ON timings of the first switch S1 and the second switch S2 are the same.

Please refer to FIG. 5 in conjugation with FIG. 3. FIG. 5 shows waveforms of signals of a heating apparatus according to the present invention, wherein the turned-ON timings of the switch S1 and the switch S2 are the same as each other.

In one embodiment of the present invention, the turned-ON timings of the switch S1 and the switch S2 are the same as each other. In such an embodiment, the present invention may adopt, for example but not limited to, a clock signal CLK to determine the turned-ON timings of the switch S1 and the switch S2. As shown in FIG. 3, the clock signal CLK is inputted into, for example but not limited to, the switch control circuit 16.

In one embodiment, as shown in FIG. 5, the slope of the ramp signal VC1 is positively correlated with the output current IH1, and the ON period T1 of the switch S1 is negatively correlated with the output current IH1. And, the ramp signal VC2 is positively correlated with the output current IH2, and the ON period T2 of the switch S2 is negatively correlated with the output current IH2.

In one specific embodiment, as shown in FIG. 5, the slope of the ramp signal VC1 is set to be proportional to the output current IH1, and the ON period T1 of the switch S1 is set to be inversely proportional to the output current IH1. And, the slope of the ramp signal VC2 is set to be proportional to the output current IH2, and the ON period T2 of the switch S2 is set to be inversely proportional to the output current IH2.

As shown in FIG. 5, assuming that the output current IH1 is 4 ampere (A) and the sensing current IC1 is $1:10^6$ proportional to the output current IH1, the sensing current IC1 is 4 micro ampere (μA); and, assuming that the output current IH2 is 8 ampere (A) and the sensing current IC2 c is $1:10^6$ proportional to the output current IH2, the sensing current IC2 is 8 micro ampere (μA). In this example as mentioned above, because the sensing current IC2 is greater than the sensing current IC1 whereby the slope of the ramp signal VC2 is greater than the slope of the ramp signal VC1, the ON period T2 of the switch S2 is shorter than the ON period T1 of the switch S1.

In other words, in this embodiment, the slope of the ramp signal VC1 is proportional to the output current IH1 (or the sensing current IC1), whereas, the ON period T1 of the switch S1 is inversely proportional to the output current IH1 (or the sensing current IC1). To be more specific, because the level of the sensing current IC1 is relatively smaller, the slope of the ramp signal VC1 is relatively smaller, and it takes longer for the ramp signal VC1 to reach the temperature-related signal VT, whereas, it takes shorter for the ramp signal VC2 to reach the temperature-related signal VT, thereby causing the ON period T1 of the switch S1 to be longer than the ON period T2 of the switch S2.

Under a circumstance where the turned-ON timings of the switch S1 and the switch S2 are the same as each other, in one embodiment, the present invention may adopt, for example but not limited to, the clock signal CLK to determine the turned-ON timings of the switch S1 and the switch S2. Accordingly, the switch S1 and the switch S2 can be turned ON simultaneously, as shown in FIG. 5.

After the switch S1 and the switch S2 are turned ON, to adjust the temperatures of the heaters 11 and 12 to one uniform temperature, the temperature sensor 1312 generates the temperature sensing signal VTS according to the operation current Icon and the temperature TS, and the error amplifier circuit EA generates the temperature-related signal VT according to a difference between the temperature sensing signal VTS and a reference voltage VREF. As a result, the heating apparatus 100 can adjust the temperature TS to a predetermined temperature level.

Because the impedances of the heaters 11 and 12 may be different from each other, the slope of the ramp signal VC1 and the slope of the ramp signal VC2 may be different from each other. As mentioned above, the present invention can generate the temperature-related signal VT by the signal processor circuit 13. By the comparison between the temperature-related signal VT and the ramp signal VC1 and by the comparison between the temperature-related signal VT and the ramp signal VC2, the turned-OFF timings of the switch S1 and the switch S2 can be determined, respectively. Accordingly, there is a predetermined ratio (e.g., 1:1) between the average powers of the heaters 11 and 12. In this way, the temperatures of the heaters 11 and 12 can be adjusted to one uniform temperature. The turned-OFF timings of the switch S1 and the switch S2 can be determined by: when the ramp signal VC1 reaches the temperature-related signal VT (whereby the PWM signal PWM1 turns OFF the switch S1) and when the ramp signal VC2 reaches the temperature-related signal VT (whereby the PWM signal PWM2 turns OFF the switch S2).

As such, the present invention only requires one single temperature sensor 1312, to generate the temperature-related signal VT, and by the temperature-related signal VT, the heating apparatus 100 of the present invention is capable of regulating powers of different heaters 11 and 12 respectively, so that there is a predetermined ratio (such as 1:1) between the average powers of the different heaters 11 and 12, and consequently, the heating apparatus 100 of the present invention can adjust the temperatures of different heaters 11 and 12 to respective predetermined temperature levels, which can be, for example but not limited to, one uniform temperature.

In the embodiment where the turned-ON timings of the switch S1 and the switch S2 are the same as each other, as shown in FIG. 5, the peak value of the supply current Iin for example can be a sum of the output current IH1 (e.g., 4 ampere (A)) and the output current IH2 (e.g., 8 ampere (A)), that is, 12 ampere (A).

Certainly, the values of the output current IH1, the output current IH2 and the supply current Iin are given only as an illustrative example, but not for limiting the scope of the present invention. In other embodiments, the output current IH1, the output current IH2 and the supply current Iin can be other values.

Figure 6:
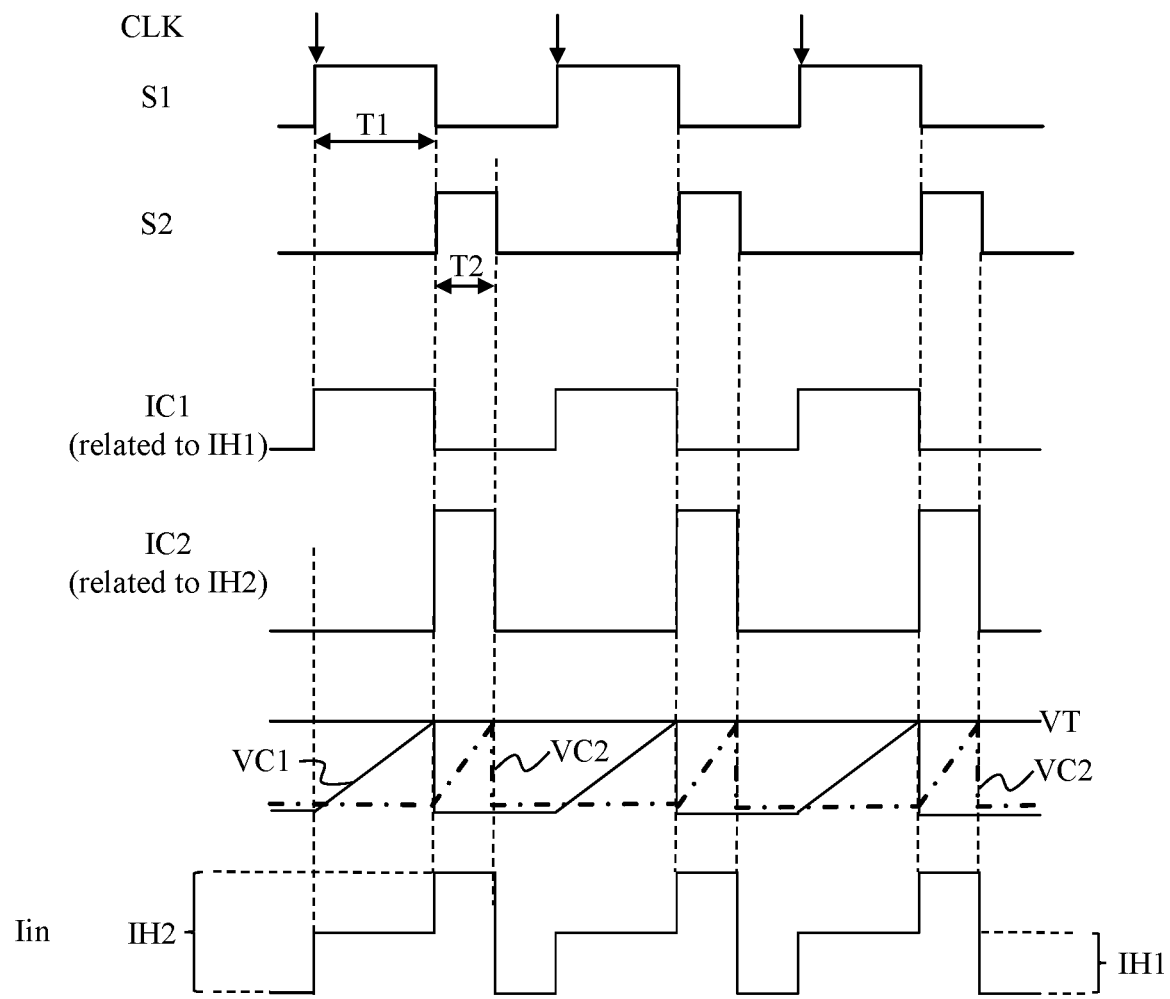
FIG. 6 shows waveforms of different signals of a heating apparatus according to the present invention, wherein the turned-ON timings of the first switch S1 and the second switch S2 are different.

Please refer to FIG. 6 in conjugation with FIG. 3. FIG. 6 shows waveforms of signals of a heating apparatus according to the present invention, wherein the turned-ON timings of the first switch S1 and the second switch S2 are different from each other.

In one embodiment of the present invention, the turned-ON timings of the switch S1 and the switch S2 are different from each other. In such an embodiment, the present invention may adopt, for example but not limited to, a clock signal CLK to only determine the turned-ON timing of the switch S1. As shown in FIG. 3, the clock signal CLK can be inputted into, for example but not limited to, the switch control circuit 16.

Under the circumstance where the turned-ON timings of the switch S1 and the switch S2 are different from each other, in one embodiment, the present invention may arrange the ON periods of the switch S1 and the switch S2 to be separated from each other. As shown in FIG. 6, the ON period T1 of the switch S1 and the ON period T2 of the switch S2 are separated from each other. Besides, in the embodiment shown in FIG. 6, the present invention may adopt, for example but not limited to, the turned-OFF timing of the switch S1 to determine the turned-ON timing of the switch S2. To be more specific, in the embodiment shown in FIG. 6, the turned-ON timings of the switch S1 and the switch S2 are different from each other, and the clock signal CLK only determines the turned-ON timing of the switch S1, while the turned-OFF timing of the switch S1 determines the turned-ON timing of the switch S2. As a result, the ON period T1 of the switch S1 and the ON period T2 of the switch S2 are separated from each other.

In regard to the mechanism for determining the turned-OFF timings of the switch S1 and the switch S2 in this embodiment, it is the same as the embodiment shown in FIG. 5. In both embodiments, through the comparison between the temperature-related signal VT and the ramp signal VC1 and through the comparison between the temperature-related signal VT and the ramp signal VC2, the turned-OFF timings of the switch S1 and the switch S2 can be determined, respectively. That is, in the embodiment shown in FIG. 6, when the ramp signal VC1 reaches the temperature-related signal VT, the PWM signal PWM1 turns OFF the switch S1; when the ramp signal VC2 reaches the temperature-related signal VT, the PWM signal PWM2 turns OFF the switch S2.

As compared to the embodiment wherein the turned-ON timings of the switch S1 and the switch S2 are the same as each other (i.e., the embodiment shown in FIG. 5), the embodiment wherein the turned-ON timings of the switch S1 and the switch S2 are different from each other (i.e., the embodiment shown in FIG. 6) has an advantage that the peak value of the supply current Iin is lower, which is equal to a higher one of the output current IH1 (e.g., 4 ampere (A)) and the output current IH2 (e.g., 8 ampere (A)). That is, in this embodiment, as shown in FIG. 6, the level of the supply current Iin is 8 ampere (A). In other words, in the embodiment wherein the turned-ON timings of the switch S1 and the switch S2 are different from each other whereby the ON period T1 of the switch S1 and the ON period T2 of the switch S2 are separated from each other, the peak value of the supply current Iin can be lowered. On the other hand, in an embodiment wherein the ON period T1 of the switch S1 and the ON period T2 of the switch S2 at least partially overlap with each other, the length of the time period of the supply current Iin can be lowered.

In addition to the above-mentioned difference, the embodiment shown in FIG. 6 has substantially the same advantages and efficacies as the embodiment shown in FIG. 5. That is, through the temperature-related signal VT, the embodiment shown in FIG. 6 is capable of regulating powers of different heaters 11 and 12 respectively, so that there is a predetermined ratio (such as 1:1) between the average powers of the different heaters 11 and 12, and consequently, the heating apparatus 100 of the present invention can adjust the temperatures of different heaters 11 and 12 to respective predetermined temperature levels, which can be, for example but not limited to, one uniform temperature.

Figure 7:
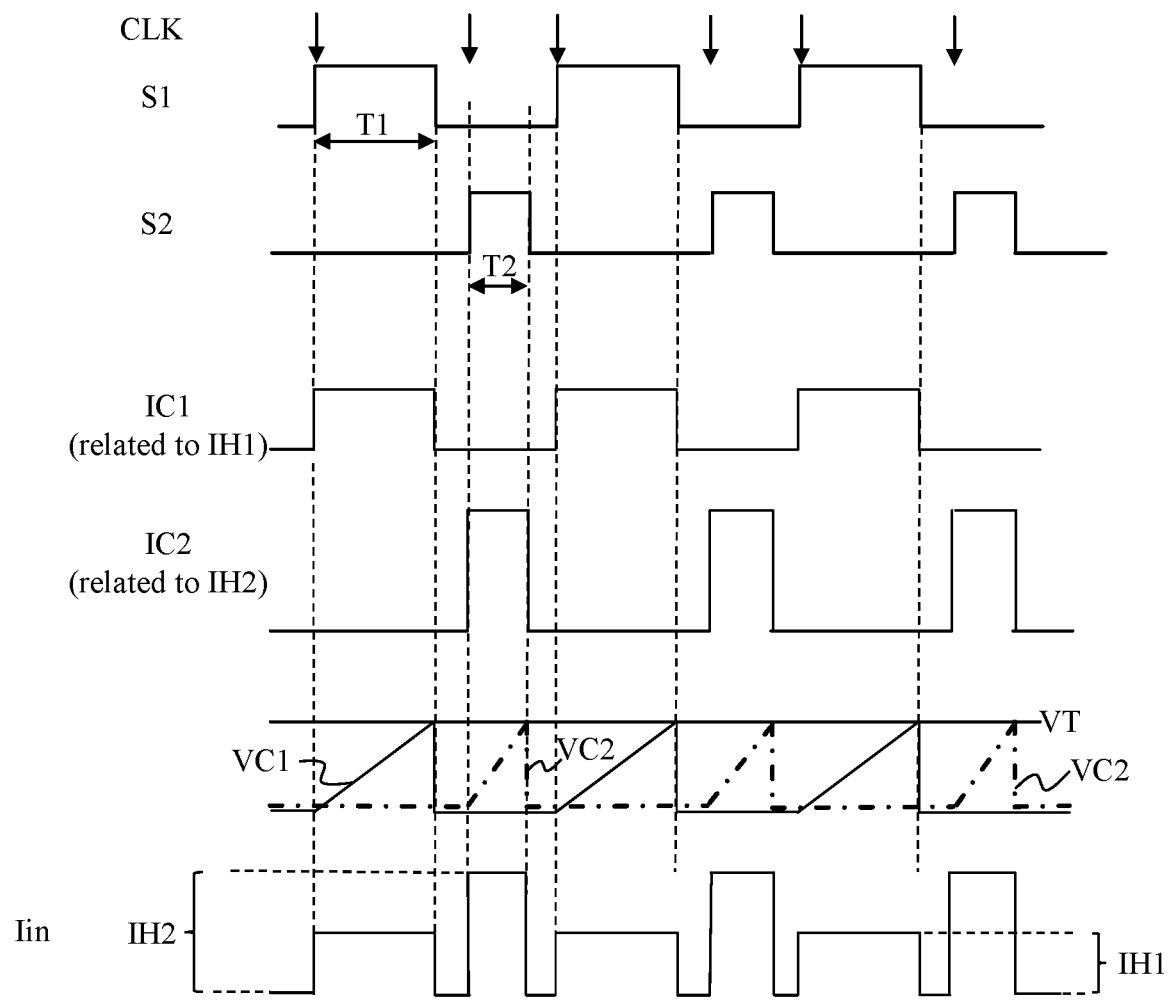
FIG. 7 shows waveforms of different signals of a heating apparatus according to the present invention, wherein the turned-ON timings of the first switch S1 and the second switch S2 are different.

Please refer to FIG. 7 in conjugation with FIG. 3. FIG. 7 shows waveforms of signals of a heating apparatus according to the present invention, wherein the turned-ON timings of the first switch S1 and the second switch S2 are different from each other.

The embodiment shown in FIG. 7 operates according to substantially the same mechanism as the embodiment shown in FIG. 6. In both embodiments shown in FIG. 7 and FIG. 6, the turned-ON timings of the first switch S1 and the second switch S2 are different from each other, but they are different in that: the embodiment shown in FIG. 7 does not adopt the turned-OFF timing of the switch S1 to determine the turned-ON timing of the switch S2. Instead, the embodiment shown in FIG. 7 may adopt, for example but not limited to, the clock signal CLK (or another clock signal) to determine the turned-ON timing of the switch S2. In brief, the embodiment shown in FIG. 7 may adopt, for example but not limited to, the clock signal CLK to determine the turned-ON timing of the switch S1 and the turned-ON timing of the switch S2. In this embodiment, the ON period T1 of the switch S1 and the ON period T2 of the switch S2 are separated from each other (as shown in FIG. 7). That is, the clock signal CLK is generated in a way to cause the turned-ON timing of the switch S1 and the turned-ON timing of the switch S2 to be separated from each other, so that the ON period T1 of the switch S1 and the ON period T2 of the switch S2 are separated from each other. In another embodiment, the clock signal CLK is adopted to determine the turned-ON timing of the switch S1 and the turned-ON timing of the switch S2 (which are separated from each other), but different from the shown embodiment, the ON period T1 of the switch S1 and the ON period T2 of the switch S2 partially overlap with each other.

In regard to the mechanism for determining the turned-OFF timings of the switch S1 and the switch S2 in this embodiment, it is the same as the embodiments shown in FIG. 5 and FIG. 6. In these three embodiments, through the comparison between the temperature-related signal VT and the ramp signal VC1 and through the comparison between the temperature-related signal VT and the ramp signal VC2, the turned-OFF timings of the switch S1 and the switch S2 can be determined, respectively. That is, in the embodiment shown in FIG. 7, when the ramp signal VC1 reaches the temperature-related signal VT, the PWM signal PWM1 turns OFF the switch S1; when the ramp signal VC2 reaches the temperature-related signal VT, the PWM signal PWM2 turns OFF the switch S2.

In addition to the above-mentioned difference, the embodiment shown in FIG. 7 has substantially the same advantages and efficacies as the embodiment shown in FIG. 6. That is, in the embodiment wherein the turned-ON timings of the switch S1 and the switch S2 are different from each other (i.e., the embodiment shown in FIG. 7), the peak value of the supply current Iin can be lowered.

Besides, the embodiment shown in FIG. 7 has substantially the same advantages and efficacies as the embodiments shown in FIGS. 5 and 6. That is, through the temperature-related signal VT, the embodiment shown in FIG. 7 is capable of regulating powers of different heaters 11 and 12 respectively, so that there is a predetermined ratio (such as 1:1) between the average powers of the different heaters 11 and 12, and consequently, the heating apparatus 100 of the present invention can adjust the temperatures of different heaters 11 and 12 to respective predetermined temperature levels, which can be, for example but not limited to, one uniform temperature.

It should be noted that, as one of average skill in the art will appreciate, the term "average power" of the above-mentioned respective heaters 11 and 12, as may be used herein (referring to FIGS. 5-7 as examples), is meant to indicate an integrated average of the product of the output currents IH1 or IH2 flowing through the heater 11 or 12 multiplied by the supply voltage of the power supply during the respective switching period of the switch S1 or S2. Because in the above-mentioned embodiments, the switches S1 and S2 and the heaters 11 and 12 are coupled in series between a power supply and a ground voltage level, respectively, the voltage across the switch S1 and the heater 11 and the voltage across the switch S2 and the heater 12 when the switches are turned ON are the same. As a result, the powers of the heaters 11 and 12 are proportional to the output currents IH1 and IH2, respectively, and because the ON-periods of the switches S1 and S2 are inversely proportional to the output currents IH1 and IH2, the same average power (a ratio of 1:1) of the heaters 11 and 12 can be achieved. Note that, in different applications, the ratio can be set to other values.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between two devices or circuits shown to be in direct connection in the embodiments, such as a switch or a resistor. For another example, it is not limited for a high level of the signal to represent ON and a low level of the signal to represent OFF. The meaning of a high level and the meaning of a low level of the signal are interchangeable, with corresponding amendments of the circuits processing these signals. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A heating apparatus, comprising:
a first heater and a second heater;
a first switch coupled in series to the first heater, wherein the first switch and the first heater are coupled in series between a power supply and a ground voltage level, the first switch being configured to be operably turned ON or turned OFF according to a first switch signal, to control a first output current flowing through the first heater;
a second switch coupled in series to the second heater, wherein the second switch and the second heater are coupled in series between the power supply and the ground voltage level, the second switch being configured to be operably turned ON or turned OFF according to a second switch signal, to control a second output current flowing through the second heater;
a first ramp signal generation circuit, which is configured to operably generate a first ramp signal according to the first output current;
a second ramp signal generation circuit, which is configured to operably generate a second ramp signal according to the second output current;
a signal processor circuit, which is configured to operably sense a temperature to generate a temperature-related signal according to the temperature;
a first comparison circuit, which is configured to operably compare the first ramp signal with the temperature-related signal, to generate a first pulse width modulation (PWM) signal;
a second comparison circuit, which is configured to operably compare the second ramp signal with the temperature-related signal, to generate a second PWM signal; and
a switch control circuit, which is coupled to the first comparison circuit and the second comparison circuit;
wherein the switch control circuit is configured to operably generate the first switch signal according to the first PWM signal;
wherein the switch control circuit is configured to operably generate the second switch signal according to the second PWM signal;
whereby, there is a predetermined ratio between a first average power of the first heater and a second average power of the second heater.

2. The heating apparatus of claim 1, wherein the first ramp signal has a first slope which is positively correlated with the first output current, such that an ON period of the first switch is negatively correlated with the first output current, and wherein the second ramp signal has a second slope which is positively correlated with the second output current, such that an ON period of the second switch is negatively correlated with the second output current.

3. The heating apparatus of claim 1, wherein the predetermined ratio of the first average power of the first heater to the second average power of the second heater is 1:1.

4. The heating apparatus of claim 1, wherein the first switch and the second switch are turned-ON at the same timing.

5. The heating apparatus of claim 1, wherein the first switch and the second switch are turned-ON at different timings, thereby lowering a peak value of a supply current provided by the power supply, wherein the supply current includes the first output current and the second output current.

6. The heating apparatus of claim 5, wherein the ON period of the second switch is separated from ON period of the second switch.

7. The heating apparatus of claim 6, wherein a turned-OFF timing of the first switch determines a turned-OFF timing of the second switch.

8. The heating apparatus of claim 1, wherein a clock signal determines a turned-ON timing of the first switch and/or a turned-ON timing of the second switch.

9. The heating apparatus of claim 1, wherein when the first ramp signal reaches the temperature-related signal, the first PWM signal turns OFF the first switch; and, when the second ramp signal reaches the temperature-related signal, the second PWM signal turns OFF the second switch.

10. The heating apparatus of claim 1, wherein the signal processor circuit includes:
a temperature sensing circuit, which is configured to operably sense the temperature to generate a temperature sensing signal; and
an error amplifier circuit coupled to the temperature sensing circuit, the error amplifier circuit being configured to operably generate the temperature-related signal according to a difference between the temperature sensing signal and a reference voltage;
whereby, the heating apparatus adjusts the temperature to a predetermined temperature level.

11. The heating apparatus of claim 10, wherein the temperature sensing circuit includes:
a current source, which is configured to operably supply an operation current to a temperature sensor, wherein the temperature sensor generate the temperature sensing signal according to the operation current and the temperature.

12. The heating apparatus of claim 11, wherein the temperature sensor includes a negative temperature coefficient thermistor.

13. The heating apparatus of claim 1, wherein the first ramp signal generation circuit includes:
a first current sensing circuit, which is configured to operably sense the first output current, wherein the first current sensing circuit is configured to operably generate a first sensing current according to the sensed first output current; and
a first capacitor, which is configured to operably generate the first ramp signal according to the first sensing current flowing through the first capacitor.

14. The heating apparatus of claim 1, wherein the second ramp signal generation circuit includes:
a second current sensing circuit, which is configured to operably sense the second output current, wherein the second current sensing circuit is configured to operably generate a second sensing current according to the sensed second output current; and
a second capacitor, which is configured to operably generate the second ramp signal according to the second sensing current flowing through the second capacitor.

15. A temperature control circuit of a heating apparatus, the heating apparatus including a first heater and a second heater; the temperature control circuit of the heating apparatus comprising:
- a first switch coupled in series to the first heater, wherein the first switch and the first heater are coupled in series between a power supply and a ground voltage level, the first switch being configured to be operably turned ON or turned OFF according to a first switch signal, to control a first output current flowing through the first heater;
- a second switch coupled in series to the second heater, wherein the second switch and the second heater are coupled in series between the power supply and the ground voltage level, the second switch being configured to be operably turned ON or turned OFF according to a second switch signal, to control a second output current flowing through the second heater;
- a first ramp signal generation circuit, which is configured to operably generate a first ramp signal according to the first output current;
- a second ramp signal generation circuit, which is configured to operably generate a second ramp signal according to the second output current;
- a signal processor circuit, which is configured to operably sense a temperature to generate a temperature-related signal according to the temperature;
- a first comparison circuit, which is configured to operably compare the first ramp signal with the temperature-related signal, to generate a first pulse width modulation (PWM) signal;
- a second comparison circuit, which is configured to operably compare the second ramp signal with the temperature-related signal, to generate a second PWM signal; and
- a switch control circuit, which is coupled to the first comparison circuit and the second comparison circuit;
- wherein the switch control circuit is configured to operably generate the first switch signal according to the first PWM signal;
- wherein the switch control circuit is configured to operably generate the second switch signal according to the second PWM signal;
- whereby, there is a predetermined ratio between a first average power of the first heater and a second average power of the second heater.

16. The temperature control circuit of the heating apparatus of claim 15, wherein the first ramp signal has a first slope which is positively correlated with the first output current, such that an ON period of the first switch is negatively correlated with the first output current, and wherein the second ramp signal has a second slope which is positively correlated with the second output current, such that an ON period of the second switch is negatively correlated with the second output current.

17. The temperature control circuit of the heating apparatus of claim 15, wherein the predetermined ratio of the first average power of the first heater to the second average power of the second heater is 1:1.

18. The temperature control circuit of the heating apparatus of claim 15, wherein the first switch and the second switch are turned-ON at the same timing.

19. The temperature control circuit of the heating apparatus of claim 15, wherein the first switch and the second switch are turned-ON at different timings, thereby lowering a peak value of a supply current provided by the power supply, wherein the supply current includes the first output current and the second output current.

20. The temperature control circuit of the heating apparatus of claim 19, wherein the ON period of the second switch is separated from ON period of the second switch.

21. The temperature control circuit of the heating apparatus of claim 20, wherein a turned-OFF timing of the first switch determines a turned-OFF timing of the second switch.

22. The temperature control circuit of the heating apparatus of claim 15, wherein a clock signal determines a turned-ON timing of the first switch and/or a turned-ON timing of the second switch.

23. The temperature control circuit of the heating apparatus of claim 15, wherein when the first ramp signal reaches the temperature-related signal, the first PWM signal turns OFF the first switch; and, when the second ramp signal reaches the temperature-related signal, the second PWM signal turns OFF the second switch.

24. The temperature control circuit of the heating apparatus of claim 15, wherein the signal processor circuit includes:
- a temperature sensing circuit, which is configured to operably sense the temperature to generate a temperature sensing signal; and
- an error amplifier circuit coupled to the temperature sensing circuit, the error amplifier circuit being configured to operably generate the temperature-related signal according to a difference between the temperature sensing signal and a reference voltage;
- whereby, the heating apparatus adjusts the temperature to a predetermined temperature level.

25. The temperature control circuit of the heating apparatus of claim 24, wherein the temperature sensing circuit includes:
- a current source, which is configured to operably supply an operation current to a temperature sensor, wherein the temperature sensor generate the temperature sensing signal according to the operation current and the temperature.

26. The temperature control circuit of the heating apparatus of claim 25, wherein the temperature sensor includes: a negative temperature coefficient thermistor.

27. The temperature control circuit of the heating apparatus of claim 15, wherein the first ramp signal generation circuit includes:
- a first current sensing circuit, which is configured to operably sense the first output current, wherein the first current sensing circuit is configured to operably generate a first sensing current according to the sensed first output current; and
- a first capacitor, which is configured to operably generate the first ramp signal according to the first sensing current flowing through the first capacitor.

28. The temperature control circuit of the heating apparatus of claim 15, wherein the second ramp signal generation circuit includes:
- a second current sensing circuit, which is configured to operably sense the second output current, wherein the second current sensing circuit is configured to operably generate a second sensing current according to the sensed second output current; and
- a second capacitor, which is configured to operably generate the second ramp signal according to the second sensing current flowing through the second capacitor.

29. A temperature control method of a heating apparatus, the heating apparatus including a first heater and a second heater; a first switch coupled in series to the first heater, wherein the first switch and the first heater are coupled in series between a power supply and a ground voltage level, the first switch being configured to control a first output current flowing through the first heater; and a second switch coupled in series to the second heater, wherein the second switch and the second heater are coupled in series between the power supply and the ground voltage level, the second switch being configured to control a second output current flowing through the second heater; the temperature control method comprising:

generating a first ramp signal according to the first output current;

generating a second ramp signal according to the second output current;

generating a temperature-related signal according to a temperature;

comparing the first ramp signal with the temperature-related signal, to generate a first PWM signal for controlling the first switch; and comparing the second ramp signal with the temperature-related signal, to generate a second PWM signal for controlling the second switch;

whereby, there is a predetermined ratio between a first average power of the first heater and a second average power of the second heater.

30. The temperature control method of claim 29, the first switch and the second switch are turned-ON at different timings, thereby lowering a peak value of a supply current provided by the power supply, wherein the supply current includes the first output current and the second output current.

31. The temperature control method of claim 29, wherein the step of generating a temperature-related signal includes the following steps:

sensing the temperature to generate a temperature sensing signal; and generating the temperature-related signal according to a difference between the temperature sensing signal and a reference voltage, whereby, the heating apparatus adjusts the temperature to a predetermined temperature level.

* * * * *